(No Model.)
T. H. BLAIR.
CAMERA.
No. 428,448. Patented May 20, 1890.
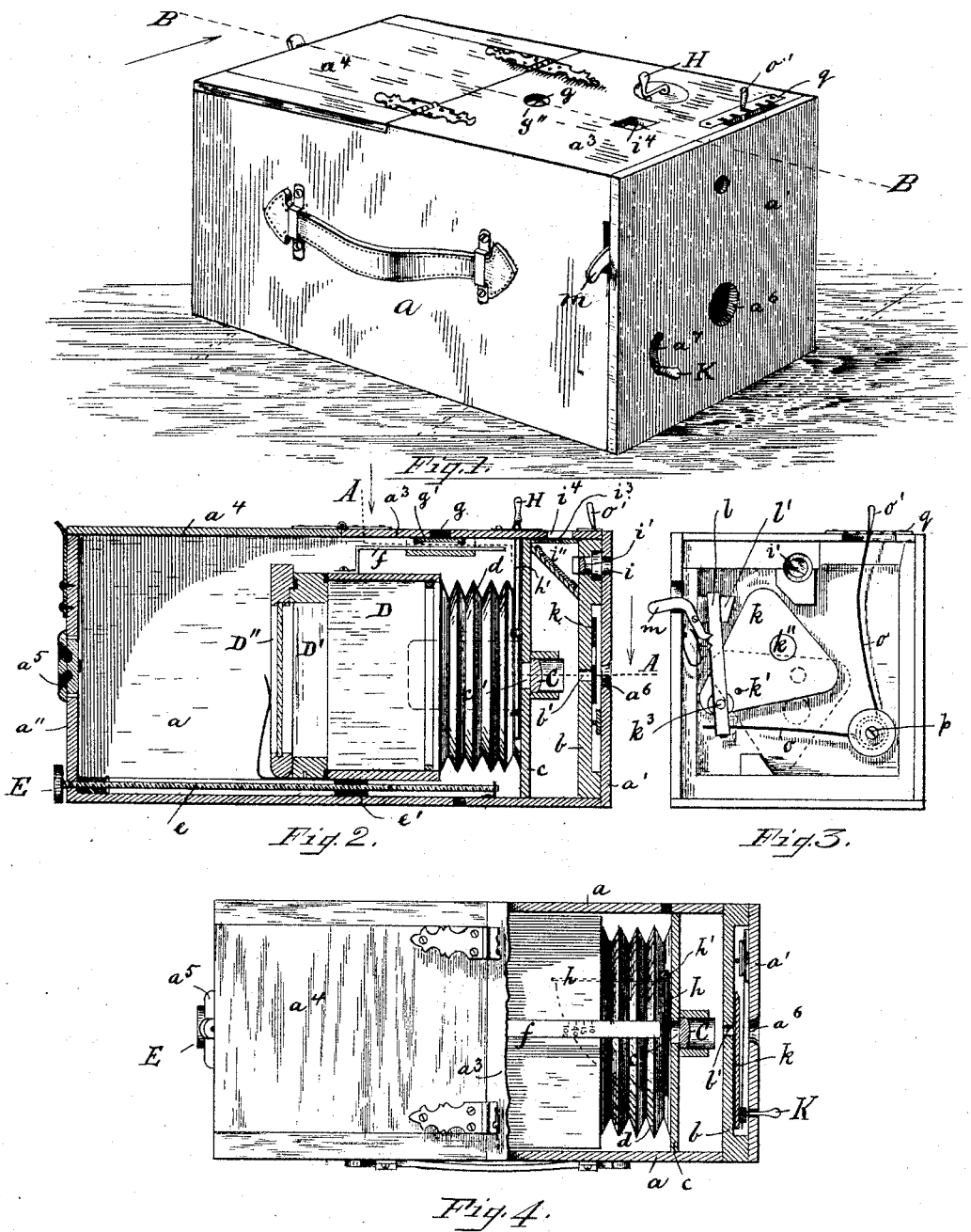
Witnesses
Mattie J Jackson
Geo. B. White
Inventor
Thomas H. Blair
by N. Van Sudren, his atty

UNITED STATES PATENT OFFICE.

THOMAS H. BLAIR, OF BOSTON, MASSACHUSETTS, ASSIGNOR TO THE BLAIR CAMERA COMPANY, OF MASSACHUSETTS.

CAMERA.

SPECIFICATION forming part of Letters Patent No. 428,448, dated May 20, 1890.

Application filed July 8, 1889. Serial No. 316,880. (No model.)

*To all whom it may concern:*

Be it known that I, THOMAS H. BLAIR, a citizen of the United States, and a resident of Boston, in the county of Suffolk and State of Massachusetts, have invented new and useful Improvements in Cameras, of which the following, taken in connection with the accompanying drawings, is a specification.

This invention relates to improvements in cameras, and it is carried out as follows, reference being had to the accompanying drawings, where—

Figure 1 represents a perspective view of the improved camera. Fig. 2 represents a longitudinal section of it on the line B B, shown in Fig. 1. Fig. 3 represents an end view of the drop-shutter and mechanism for its operation; and Fig. 4 represents a partial top view of the camera and section on the broken line A A, shown in Fig. 2.

Similar letters refer to similar parts wherever they occur on the different parts of the drawings.

$a$ represents the outer box or case in which the camera is inclosed, said box having front $a'$, back $a''$, stationary top $a^3$, and hinged cover $a^4$, as shown in Figs. 1, 2, and 4. The back $a''$ has a perforation normally closed by the button or cover $a^5$, which latter is removed when it is desired to focus the image whenever so required. Back of the front $a'$ is arranged a stationary plate or partition $b$, between which and the said front $a'$ is arranged the drop-shutter and mechanism for its operation, as will hereinafter be described. A short distance back of the said partition $b$ is arranged the stationary partition $c$, to which the front end of the collapsible bellows $d$ is secured, as shown in Figs. 2 and 4. To the rear end of the bellows $d$ is secured the longitudinally-adjustable camera D, provided in its rear end with the detachable hollow frame D' and detachable focusing-glass frame D'', as is common in cameras.

By removing the focusing-frame D'' the plate-holder may be substituted, as usual, and by removing both the hollow frame D' and the focusing-glass frame D'' a roll-holder may be substituted, as is common in cameras of this kind. The camera D is longitudinally adjustable within the box $a$ for the purpose of focusing the object according to the distance it is from the camera. This is done from the outside of the box $a$ by means of the quick-screw $e$, working in a nut $e'$, secured to the under side of the camera D, said screw having its rear end projecting through the end $a''$ of the box $a$ and there provided with a regulating knob or button E, as shown in Figs. 2 and 4, by which arrangement the camera can be focused from the outside of the said box $a$ without opening the cover $a^4$, which is a great convenience in focusing the object.

In connection with the camera I use an improved focus-registering device, which is constructed as follows: To the top of the adjustable camera D is secured the graduated bar or register $f$, having on its top a graduated scale and figures indicating the different distances of the object from the camera and for which it is to be focused when photographing at these distances. Above said bar is made through the top $a^3$ of the box $a$ a perforation $g$, below which is preferably secured a transparent glass $g'$, having across it a line or index $g''$, as shown in Fig. 1, by means of which the graduated scale on the bar $f$ can be ascertained. Thus, for instance, if the object to be photographed is, say, ten, fifteen, twenty, or more or less feet away, the screw $e$ is turned until the corresponding numerals on the bar $f$ come directly below the line or index on the glass $g'$. The said glass may, however, be dispensed with and a fine hair, wire, or equivalent marker or index-pointer placed on the box-top $a^3$ within or below its perforation $g$ without departing from the essence of my invention. The front plate $c$ of the bellows has a horizontal perforation $c'$, through which the light enters the camera after first passing through the lens C, as shown in Figs. 2 and 4. Inside of the bellows $d$ and back of the plate $c$, and its lens C, I arrange an auxiliary shutter $h$, preferably made in the shape of a vane or wing, as shown, and attached to a spindle $h'$, located in suitable bearings, with its upper end projecting through a perforation in the top $a^3$ of the box $a$ and provided with a suitable crank or knob H outside of the said top $a^3$, so as to permit said auxiliary shutter to be operated from the outside of the box $a$, as shown. The object of this auxiliary shutter is to prevent accidental exposure of the plate by prematurely or accidentally pulling the trigger that releases the main shutter, as will hereinafter be described. In connection with said knob or crank H suitable stops may be employed for the purpose of limiting the swinging motion of said auxiliary shutter and to hold it locked in its open or closed position, as may be desired.

I prefer to use in connection with this my improved camera a finder, for the purpose of ascertaining when the object desired to be taken is projected on the plate, and for this purpose I make through the end plates $a'$ $b$ a perforation $i$, in which is inserted a small lens $i'$, back of which is located an inclined mirror $i''$, from which the object is reflected upward on the ground glass $i^3$, located below a perforation $i^4$ in the top or cover $a^3$ of the box $a$, as shown in Figs. 1 and 2.

The main shutter and mechanism for setting it, releasing it, and regulating the speed of its closing movement is constructed and arranged as follows: Centrally in a line with the lens C are made perforations $b'$ and $a'$, as shown in Figs. 2 and 4. In front of the perforation $b'$ is arranged the main shutter $k$, which is pivoted at $k'$ and provided with a perforation $k''$, coinciding with the perforations $b'$ and $a^6$ when the exposure takes place. To said shutter $k$ is pivoted at $k^3$ the notched locking and releasing bar $l$, having its upper end guided in a suitable bearing $l'$, as shown in Fig. 3. In connection with said notched bar $l$, I use a pivoted spring-pressed trigger $m$, the outer end of which projects outside of the case $a$ through a perforation in its side, its inner end being made to engage or mesh into the uppermost of the notches in the bar $l$ when the shutter is set previous to making an exposure, as shown in Fig. 3. The bar $l$ is automatically forced upward as soon as released by the influence of a spring $o$, preferably made knee-shaped, its middle portion being wound once or more around the stationary pin or screw $p$, and having its upper end projecting upward through a slot in the top plate $a^3$, as shown in Fig. 3. The said spring terminates in its upper end as a knob, lever, or handle $o'$, that projects upward and outside of the top plate $a^3$ and is adapted to be locked and retained in position in a notched plate $g$, secured to the top of the cover $a^3$, as shown in Figs. 1 and 3, and by this arrangement the said spring $o$ may be tightened or loosened from the outside, according to the speed with which the shutter $k$ is to be closed when released. After the shutter is set, as shown in Fig. 3, to release it for the purpose of making an exposure it is only necessary to press the outwardly-projecting end of the trigger $m$ upward, causing the spring-pressed lever $l$ to be released and causing the shutter $k$ to swing on its fulcrum $k'$ to the position shown in dotted lines in Fig. 4, during which movement the instantaneous exposure is made, when the perforations $k''$, $a^6$, and $b'$ coincide, a further motion of the shutter in the same direction causing the opening $b'$ to be closed. The pin $k^3$ projects through a curved slot $a^7$ in the front plate $a'$, and is there provided with a knob or handle K for the purpose of setting the shutter from the outside of the box $a$ previous to making the exposure.

In using the improved camera I proceed as follows: If the object to be taken is in such a position that it can be focused by the eye of the operator, I remove the button $a^5$, set the shutter $k$ open—that is, on what may be termed "half-cock"—and swing the auxiliary or safety shutter $h$ open, as shown in dotted lines in Fig. 4, after which I move the box D and its focusing-glass D'' by means of the knob E and screw $e$ until the object appears sharp and clear on the focusing-glass. If an instantaneous picture is to be taken from an object the approximate distance from the camera of which is known or determined upon, then I do the focusing by means of the focusing-register hereinabove described—that is, supposing the object to be taken is, say, about forty feet from the camera, I then turn the knob E and its screw $e$ until the figure forty (40) on the bar $f$ comes directly below the stationary scratch, mark, or index-pointer $g''$, which can be ascertained by looking through the perforation $g$, as described. I then close the main shutter $k$ by swinging it upward against the influence of the spring $o$ to the position shown in Fig. 3 and automatically lock it in such position by the trigger $m$, as shown in Fig. 3, and as a matter of precaution I also close the safety-shutter $h$, as shown in Figs. 2 and 4. The plate-holder is inserted in place of the focusing-frame and its plate uncovered, or a roll-holder used by removing also the frame D', as may be desired. The object is now ready to be taken by first swinging open the safety-shutter $h$ and pulling or pushing upward the trigger $m$ the moment the image appears on the ground finder-glass $i^3$, causing the bar $l$ to be released from the inner end of the trigger $m$ and the shutter $k$ to swing very quickly to the position shown in dotted lines in Fig. 3, being so impelled by the adjustable spring $o$, as above mentioned. An instantaneous exposure takes place the moment that the shutter-opening $k''$ passes by the opening $b'$ in front of the lens C, as shown in the drawings.

If so desired, the improved camera may be used by placing it on a tripod, as is usual on cameras; but it is particularly designed for the purpose of taking instantaneous views simply by holding the box in the hands of the operator.

Having thus fully described the nature, construction, and operation of my invention, I wish to secure by Letters Patent, and claim—

1. In a camera, the combination of the inclosing-case $a$, having a sight-orifice $g$ and a stationary index $g^2$, with the adjustable sliding camera obscura having the graduated focusing-bar $f$, arranged within the inclosing-case and sliding with the camera obscura, substantially as described.

2. In a camera, the combination, with the inclosing-case, the lens C, the bellows $d$ within the case, and a main shutter $k$ in front of the lens, of a pivoted auxiliary safety-shutter $h$, which swings inside the bellows behind the lens, substantially as described.

3. In a camera, the combination of an inclosing-case, a camera obscura arranged to slide in a right line within the case, a screw-nut attached to the sliding camera obscura, and an axially-rotating screw journaled within the case, engaging the nut, and extending through the end of said case, and by its rotation causing the nut to travel thereupon and slide the camera obscura, substantially as described.

4. In a camera, the spring-pressed main shutter $k$ and its spring $o$, having one of its ends $o'$ projecting outside of the box $a$, and having combined with it a notched locking-plate $g$, for the purpose of regulating the tension of said spring from the outside of said box $a$, substantially as and for the purpose set forth.

5. In a camera, the combination of an inclosing-case $a$, having in its front wall a segmental slot $a^7$, an oscillating shutter $k$, having a pivoted locking and releasing bar $l$, provided with a pin $k^3$, extending through the segmental slot in the case, a trigger for the locking and releasing bar, and an actuating-spring $o$, substantially as described.

In testimony whereof I have signed my name to this specification, in the presence of two subscribing witnesses, on this 28th day of June, A. D. 1889.

THOMAS H. BLAIR.

Witnesses:
ALBAN ANDRÈN,
MATTIE J. JACKSON.